(12) United States Patent
Sampson

(10) Patent No.: US 7,540,071 B2
(45) Date of Patent: Jun. 2, 2009

(54) INTERLOCKED TWO-PART CLAMP

(75) Inventor: James M. Sampson, Southfield, MI (US)

(73) Assignee: Franklin Fastener Company, Redford Township, MI (US)

( * ) Notice: Subject to any disclaimer, the term of this patent is extended or adjusted under 35 U.S.C. 154(b) by 462 days.

(21) Appl. No.: 11/375,758

(22) Filed: Mar. 15, 2006

(65) Prior Publication Data

US 2006/0213039 A1    Sep. 28, 2006

Related U.S. Application Data

(60) Provisional application No. 60/664,434, filed on Mar. 23, 2005.

(51) Int. Cl.
*E04F 19/02* (2006.01)
(52) U.S. Cl. .................. 24/284; 24/279
(58) Field of Classification Search ............ 24/19, 24/20 EE, 279–282, 284, 285; 285/365, 285/367, 406, 407, 410, 420; 403/49, 246, 403/256
See application file for complete search history.

(56) References Cited

U.S. PATENT DOCUMENTS

| | | | |
|---|---|---|---|
| 411,967 A * | 10/1889 | Rieseck ............... 24/279 |
| 847,620 A * | 3/1907 | Thompson ............ 24/284 |
| 875,019 A * | 12/1907 | Wahlert ............... 24/284 |
| 1,205,926 A * | 11/1916 | Palmer et al. ........ 24/275 |
| 1,505,255 A * | 8/1924 | Gold ................... 24/284 |
| 2,141,222 A | 12/1938 | Pioch |
| 3,014,259 A * | 12/1961 | Louis .................. 24/284 |
| 3,471,176 A * | 10/1969 | Gilchrist ............. 285/373 |
| 3,594,682 A | 7/1971 | Oleson |
| 3,694,012 A * | 9/1972 | Gelfand ............. 403/306 |
| 3,964,773 A * | 6/1976 | Stade et al. ........ 285/411 |
| 4,372,637 A | 2/1983 | Lane et al. |
| 4,380,102 A | 4/1983 | Hansson |
| 4,742,600 A | 5/1988 | Calmettes et al. |
| 4,783,029 A | 11/1988 | Geppert et al. |
| 4,915,418 A * | 4/1990 | Palatchy ............. 24/284 |
| 5,018,768 A * | 5/1991 | Palatchy ............. 24/284 |
| 5,333,917 A | 8/1994 | Davey et al. |
| 5,596,790 A | 1/1997 | Moller |
| 5,842,725 A * | 12/1998 | Allert ................. 24/279 |
| 5,918,350 A | 7/1999 | Detable et al. |
| 2004/0025305 A1 | 2/2004 | Sidaine et al. |

* cited by examiner

*Primary Examiner*—Robert J Sandy
*Assistant Examiner*—Ruth C Rodriguez
(74) *Attorney, Agent, or Firm*—Brooks Kushman P.C.

(57) ABSTRACT

An interlocked clamp for an elongated member such as a pipe, tube cable, or the like is provided. The two-part clamp is interlocked on one end and is secured by a fastener to a supporting surface on an opposite end. The two parts are interlocked by a T-shaped distal end of one of the clamp members that is received in an elongated slot formed in the other clamp member. A finger is provided that extends across the slot and secures the T-shaped distal end within the slot.

10 Claims, 2 Drawing Sheets

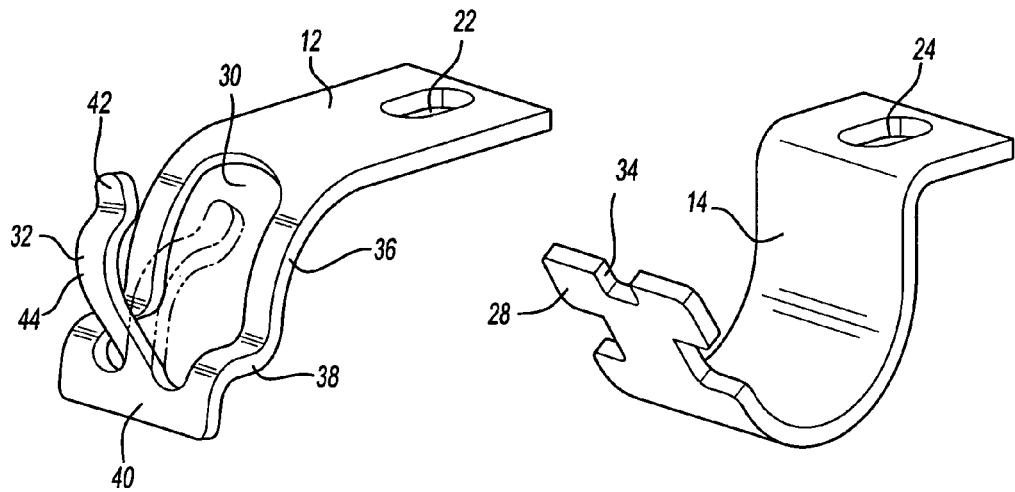
*Fig-4A*  *Fig-4B*
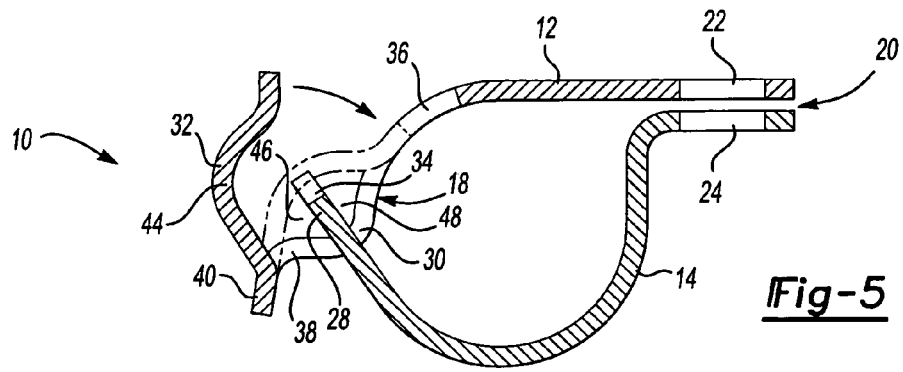
*Fig-5*
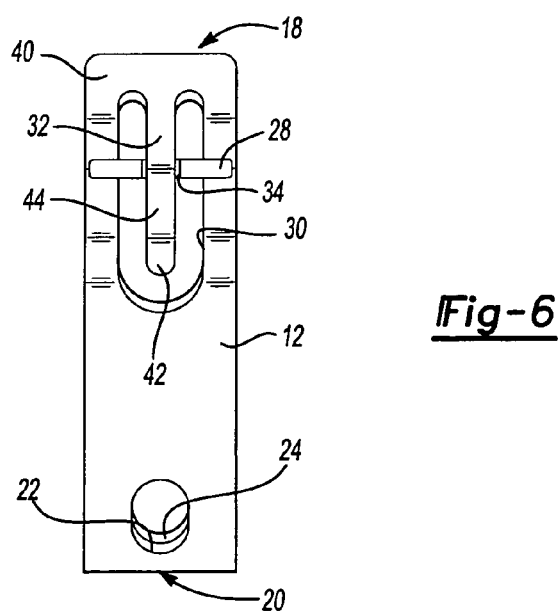
*Fig-6*

INTERLOCKED TWO-PART CLAMP

CROSS-REFERENCE TO RELATED APPLICATIONS

This application claims the benefit of U.S. provisional application Ser. No. 60/664,434 filed Mar. 23, 2005.

BACKGROUND OF THE INVENTION

1. Field of the Invention

The present invention relates to clamps for tubes, pipes, conduits and similar elongated members.

2. Background Art

Clamps are well known devices that may be used to engage and secure articles to a supporting surface. One type of clamp is a tube clamp that is used to clamp a tube and secure it to a supporting surface. The supporting surface may be part of a vehicle such as an engine or a building structure. The tube engaged by the clamp may also be a pipe or conduit.

In vehicle assembly operations, tube clamps are used to secure hydraulic tubes, pneumatic tubes, fuel system tubes, brake system tubes, and the like to a vehicle engine or body. To minimize cost, simple tube clamps have been developed that can be manufactured by progressive sheet metal dies and roll forming tooling. The simplest form of clamp is a strap that may be formed around the tube and secured to a supporting structure. This simple strap approach cannot be used in many applications where a tube must be securely anchored. A clamp that may be formed or bent around the tube generally lacks the strength and durability required to securely clamp a tube to a supporting structure in demanding applications.

Two-part clamps have been developed that are loosely linked on one side of the tube and are secured on the opposite side of the tube to a supporting structure. Two-part clamps can be made of thicker and more durable materials because they do not require bending around the tube that is intended to be supported by the clamp. One problem associated with two-part clamps is that they must be assembled together just prior to attachment to the tube, or if they are handled after preassembly, they must be held together during handling and shipping operations. If the two parts of the clamp are preassembled, they tend to become separated and require reassembly prior to being secured to the supporting structure. In vehicle and engine assembly plants, it is preferred that parts be preassembled to minimize labor expense. If preassembled parts become separated, additional labor may be required to reassemble the parts together prior to the final assembly operation.

There is a need for a simple, inexpensive two-part clamp for securing tubes to supporting structures. There is a further need for a two-part clamp that resists disassembly and may be permanently interlocked together both before and after assembly to a supporting structure.

SUMMARY OF THE INVENTION

According to one aspect of the present invention, a clamp for an elongated member, such as a pipe, tube, conduit or the like, is provided that is secured by a fastener to a supporting surface. The clamp may comprise a first clamp portion having a first anchoring end that has a first fastener receiving opening. The first clamp portion also has a first interlocking end with an elongated slot that has a width dimension that is less than a length dimension. The slot has a finger that extends at least partially across the length of the slot. A first curved portion is provided between the first anchoring end and the first interlocking end. A second clamp portion, having a second anchoring end, including a second fastener receiving opening is also provided. The second clamp portion has a second interlocking end formed as a T-shaped end that is wider than the width dimension of the slot and is shorter than the length dimension of the slot. The T-shaped end of the second clamp portion is received in the slot with the T-shaped end extending across the width of the slot to hold the first and second interlocking ends together. A second curved portion is provided between the second anchoring end and the second interlocking end. The first and second fastener receiving openings are aligned to receive the fastener for securing the clamp to the supporting surface. The first and second interlocking ends are assembled together so that the elongated member may be received between the first and second curved portions.

According to other aspects of the invention as they relate to the clamp described above, the finger may extend from one end of the slot and may be formed over the T-shaped end to retain it within the slot. An offset may be formed in the interlocking end of the first clamp portion adjacent the slot that extends outwardly from the first curved portion. The finger is formed over the T-shaped end to define a passage in conjunction with the offset. The T-shaped end may have an end notch for receiving the finger that is formed over the T-shaped end. The first and second interlocking ends, when assembled together, hold the first and second clamp portions together with the finger preventing disassembly of the first and second clamp portions even if the first and second fastener receiving ends are not secured together.

According to another aspect of the present invention, a tube clamp is provided that is made up of a base strip and a cover strip. The base strip has a base anchoring end, a base body portion that is disposed adjacent the base anchoring end, and a base interlocking end that is disposed on the opposite side of the body portion from the base anchoring end. The base interlocking portion has an elongated slot and a finger is provided on the base strip that extends at least partially across the slot. The cover strip has a cover anchoring end and a cover body portion that is disposed adjacent the cover anchoring end. The cover interlocking end is disposed on the opposite side of the body portion from the cover anchoring end. The cover interlocking portion has a T-shaped distal end. The base interlocking portion and the cover interlocking portion are assembled together with the T-shaped distal end being inserted into the elongated slot. The finger traps the T-shaped distal end within the slot.

According to other aspects of the invention as they relate to the tube clamp, an offset may be formed in the interlocking portion of the base strip adjacent the elongated slot. The offset extends outwardly from the base portion and the finger is formed over the T-shaped distal end of the cover interlocking portion to define a passage in conjunction with the offset. The T-shaped distal end may also define an end notch and the end notch may receive the finger that is formed over the T-shaped distal end. The first and second interlocking portions, when assembled together, hold the base and cover strips together with the finger preventing disassembly of the base and cover strips.

According to another aspect of the present invention, a method is provided for securing a tube to a supporting surface. The method comprises the steps of forming a first clamp member to have an anchor flange, a body portion and an interlocking portion. The interlocking portion defines a slot and has a finger that is associated with the slot. A second clamp member is formed to include an anchor flange, a body portion and an interlocking portion. The interlocking portion has an end that defines a reduced width portion inset from the end and a distal end that is of greater width than the reduced width portion. The interlocking portion of the second clamp is assembled to the interlocking portion of the first clamp by inserting the distal end and reduced width portion into the slot and rotating the second clamp member to cause the distal end to span the slot with the reduced width portion being disposed in the slot. The finger is formed over the distal end of the interlocking portion of the second clamp member to retain the interlocking portion of the second clamp in engagement with the interlocking portion of the first clamp. The body portion of the first clamp member and the body portion of the second clamp member are placed around the tube. The anchor flange of the first clamp member and the anchor flange of the second clamp member are aligned and the anchor flanges of the inner and second clamp members are attached to the supporting surface.

According to another aspect of the present invention as it relates to the above-described method, the method may further comprise forming a notch in the distal end of the second clamp member wherein the step of forming the finger over the distal end of the second clamp member further includes forming the finger into the notch. The method may also further comprise forming first and second fastener receiving openings in the anchor flanges of the inner and second clamp member and the attaching step may further include inserting a fastener in the first and second fastener receiving openings to secure the inner and second clamp members to the supporting surface.

BRIEF DESCRIPTION OF THE DRAWINGS

FIG. 4a is a perspective view of a first part of a two-part clamp showing a locking finger in its preassembly position with the locking finger being shown in phantom lines in its assembled position;

FIG. 4b is a perspective view of a second part of a two-part clamp;

FIG. 5 is a cross-sectional view of the two parts shown in FIGS. 4a and 4b with the interlocking finger shown in its preassembly position and with the interlocking finger in its assembled position being shown in phantom lines; and FIG. 6 is a bottom plan view of the assembled two-part clamp.

DETAILED DESCRIPTION OF THE PREFERRED EMBODIMENT(S)

Figure 1:
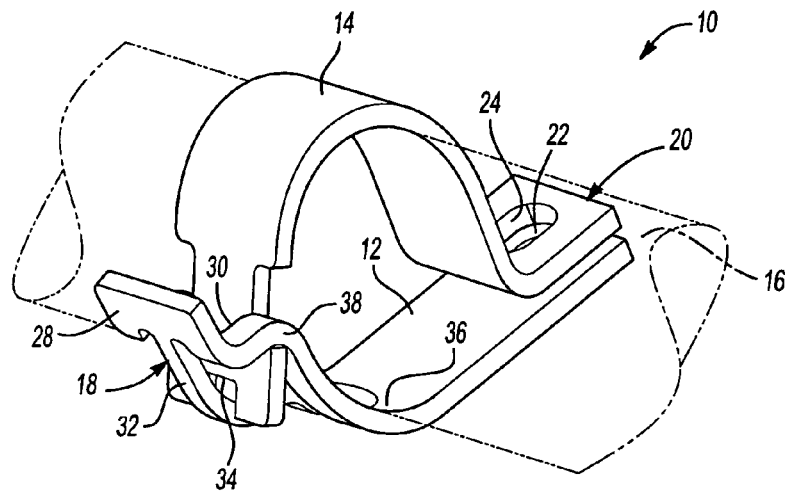
FIG. 1 is a perspective view of a two-part clamp made according to the present invention.

Referring to FIG. 1, a two-piece clamp 10, made according to one embodiment of the present invention, is illustrated. The two-piece clamp 10 has a first clamp portion 12 and a second clamp portion 14. The first clamp portion 12 and second clamp portion 14 are assembled about a tube 16 that is shown in phantom. The tube may be any type of cylindrical object that is intended to be secured to a supporting surface. The tube may be a tubular member such as a metal tube through which fluid or gaseous products are passed. Alternatively, the tube may be a conduit for electrical wires. In one exemplary application, the tube may be an exhaust gas recirculation (EGR) tube that is secured to an engine.

Figure 2:
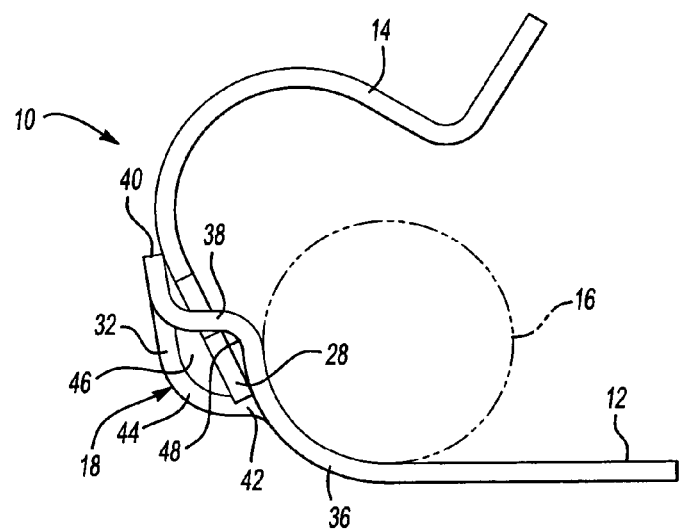
FIG. 2 is a side elevation view of the two-part clamp of the present invention shown in its open position.
Figure 3:
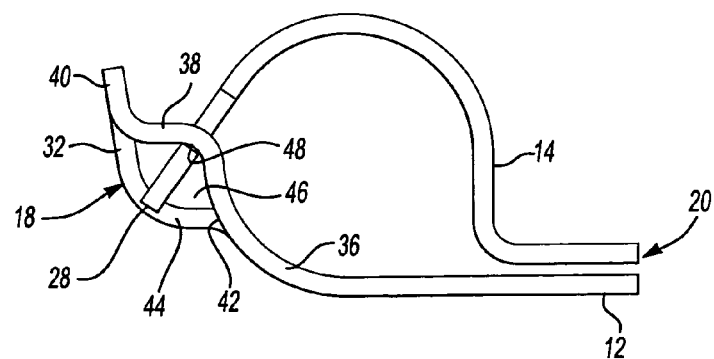
FIG. 3 is a side elevation view of a two-part clamp in its closed position.

The two-piece clamp 10 has an interlocked end 18 and an anchoring end 20. At the interlocked end 18, the first clamp portion 12 and second clamp portion 14 are interlocked together. As shown in FIG. 2, the first clamp portion 12 and second clamp portion 14 may be opened at the anchoring end 20 of the two-piece clamp 10 to permit the clamp to be assembled about the tube 16. As shown in FIG. 3, the first clamp portion 12 and second clamp portion 14 may be moved to a closed position. The first clamp portion 12 has a first fastener receiving opening 22. The second clamp portion 14 has a second fastener receiving opening 24. The two-piece clamp 10 is assembled to a supporting surface by inserting a fastener (not shown) through the first and second fastener receiving openings 22 and 24. When a fastener is securely received in the openings 22 and 24, the anchoring end 20 is held in the closed position shown in FIG. 3. The interlocked end 18 is securely locked in position in the closed position.

Side notches 26 are formed on opposite sides of the T-shaped end 28 of the second clamp portion 14. The T-shaped end 28 is received in a slot 30 formed in the first clamp portion 12. An interlocking finger 32 is integrally formed as part of the first clamp portion 12. When first clamp portion 12 and second clamp portion 14 are assembled together, the T-shaped end 28 is received in the slot 30. Interlocking finger 32 is received in a notch 34 formed in the T-shaped end 28 of the second clamp portion 14.

Referring to FIG. 4a, the structure of the first clamp portion 12 will be described in isolation. The first clamp portion 12 has a first fastener receiving opening 22 formed in the end that is referred to as the anchoring end 20 of the two-piece clamp 10. The first clamp portion 12 has a curved portion 36 that is curved to a radius to accommodate a portion of the surface of the tube 16 to be received within the clamp 10. An offset 38 extends generally rearwardly outwardly from the curved portion 36 to an end portion 40. Interlocking finger 32 is initially formed to the position shown in solid lines in FIG. 4a by a roll forming process. The material that forms the interlocking finger 32 is formed from material removed from the first clamp portion 12 to form the slot 30. When the first clamp portion 12 and second clamp portion 14 are assembled together, they are relatively firmly interlocked by bending the interlocking finger 32 to the position shown in phantom in FIG. 4a.

Referring to FIG. 4b, second clamp portion 14 is shown to include the second fastener receiving opening 24 at the anchoring end of the two-piece clamp 10. The T-shaped end 28 of the second clamp portion 14 is formed by cutting out the side notches 26 and also includes the notch 34.

Referring to FIG. 5, first clamp portion 12 and second clamp portion 14 are shown as they are initially assembled together with the T-shaped end 28 being received in the slot 30. The interlocking finger 32 is shown in its open position in solid lines and in its closed, or interlocking position, in phantom lines. The second clamp portion 14 is assembled to the first clamp portion 12 by inserting the T-shaped end 28 into slot 30 with the T-shaped end 28 being turned relative to the slot 30 in a lengthwise direction. The first clamp portion 12 and second clamp portion 14 are then positioned so that the first and second fastener receiving openings 22 and 24 are aligned. The interlocking finger is then formed to the position shown in phantom lines in FIG. 5 and is received in the notch 34. An end portion 42 of interlocking finger 32 in the interlocking position may be formed back to the slot 30 in the first clamp portion 12 and may follow the contour of the curved portion 36 to a limited extent, as shown. An intermediate portion 44 of interlocking finger 32 is received in the notch 34. The intermediate portion 44 is curved back towards the curved portion 36 so that an elongated passage 46 is provided for receiving the T-shaped end 28.

When the two-piece clamp 10 is in its open position, as shown in FIG. 2, the T-shaped end 28 is loosely received in the passage 46 to permit limited relative movement between the inner arm and second clamp portion 14. However, when the first clamp portion 12 and second clamp portion 14 are assembled together in their closed position, as shown in FIG. 3, the T-shaped end 28 wedges between the interlocking finger 32 and the recess 48 formed at the intersection of the curved portion 36 and the offset 38. In this way, the interlocking finger 32 traps the T-shaped end 28 in conjunction with the recess 48 formed in the first clamp portion 12.

Referring to FIG. 6, the assembled two-piece clamp 10 is shown. The first clamp portion 12 is shown with the T-shaped end 28 of the second clamp portion 14 interlocked with the interlocking finger 32 of the first clamp portion 12. The T-shaped end 28 extends through the slot 30 and spans essentially the full width of the first clamp portion 12. The interlocking finger 32 extends perpendicularly relative to the T-shaped end 28 and is received in the notch 34 formed in the T-shaped end 28. The first and second fastener receiving openings 22 and 24 are aligned with each other for receiving a fastener (not shown).

In this position, side-to-side movement of the interlocked end 18 of the two-piece clamp 10 is precluded by the way in which the T-shaped end 28 is received in the slot 30 and the interlocking finger 32 is received in the notch 34. Movement in the direction of the length of the clamp 10 is limited in the open position by the passage 46 defined by the interlocking finger 32 and the offset 38. In the closed position, shown in FIG. 3, lengthwise and lateral relative movement of the first clamp portion 12 and second clamp portion 14 is precluded by the interlocking finger 32 and T-shaped end 28 and also by the fastener that extends through the first and second fastener receiving openings 22 and 24 to secure the clamp to a supporting surface.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A clamp for an elongated member that is secured by a fastener to a supporting surface, the clamp comprising:
   a first clamp portion having a first anchoring end that has a first fastener receiving opening, the first clamp portion having a first interlocking end with an elongated slot that has a width dimension that is less than a length dimension, the slot having a finger that extends at least partially across the length of the slot, the first clamp portion having a first curved portion between the first anchoring end and the first interlocking end;
   a second clamp portion having a second anchoring end tat has a second fastener receiving opening, the second clamp portion having a second interlocking end with a T-shaped end that is wider than the width dimension of the slot and is shorter than the length dimension of the slot, wherein the T-shaped end of the second clamp portion is received in the slot with the T-shaped end extending across the width of the slot to hold the first and second interlocking ends together, the second clamp portion having a second curved portion between the second anchoring end and the second interlocking end; and wherein the finger is formed over the T-shaped end with a free end of the finger being formed into the slot to restrict movement of the T-shaped end within the slot; and
   wherein the first and second fastener receiving openings are aligned to receive the fastener for securing the clamp to the supporting surface and the first and second interlocking ends are assembled together, wherein the elongated member may be received between the first and second curved portions.

2. The clamp of claim 1 wherein the finger extends from one end of the slot and is formed over the T-shaped end to retain the T-shaped end within the slot.

3. The clamp of claim 1 wherein an offset is formed in the interlocking end of the first clamp portion adjacent the slot that extends outwardly from the first curved portion and the finger is formed over the T-shaped end to define a passage in conjunction with the offset.

4. The clamp of claim 1 wherein the T-shaped end has an end notch, and wherein the end notch receives the finger that is formed over the T-shaped end.

5. The clamp of claim 1 wherein the first and second interlocking ends when assembled together hold the first and second clamp portions together with the finger preventing disassembly of the first and second clamp portions even if the first and second fastener receiving ends are not secured together.

6. A tube clamp comprising:
   a base strip having a base anchoring end, a base body portion that is disposed adjacent the base anchoring end, and a base interlocking end disposed on the opposite side of the body portion from the base anchoring end, wherein the base interlocking portion has an elongated slot, and wherein a finger is provided on the base strip that extends at least partially across the slot;
   a cover strip having a cover anchoring end, a cover body portion that is disposed adjacent the cover anchoring end, and a cover interlocking end disposed on the opposite side of the body portion from the cover anchoring end, wherein the cover interlocking portion has a T-shaped distal end; and
   wherein the base interlocking portion and the cover interlocking portion are assembled together with the T-shaped distal end being inserted into the elongated slot and wherein the finger traps the T-shaped distal end within the slot, wherein the T-shaped distal end also defines an end notch, and wherein the end notch receives the finger that is formed over the T-shaped distal end.

7. The tube clamp of claim 6 wherein an offset is formed in the interlocking portion of the base strip adjacent the elongated slot that extends outwardly from the base body portion and the finger is formed over the T-shaped distal end of the cover interlocking portion to define a passage in conjunction with the offset.

8. The tube clamp of claim 6 wherein the first and second interlocking portions when assembled together hold the base and cover strips together with the finger preventing disassembly of the base and cover strips.

9. A method of securing a tube to a supporting surface comprising:
   forming a first clamp member to have an anchor flange, a body portion and interlocking portion, the interlocking portion defining a slot and having a finger that is associated with the slot;
   forming a second clamp member to have an anchor flange, a body portion and interlocking portion, the interlocking portion having an end that defines a reduced width portion inset from the end and a distal end that is of greater width than the reduced width portion;

assembling the interlocking portion of the second clamp to the interlocking portion of the first clamp by inserting the distal end and reduced width portion into the slot and rotating the second clamp member to cause the distal end to span the slot with the reduced width portion being disposed in the slot;

forming the finger over the distal end of the interlocking portion of the second clamp member to retain the interlocking portion of the second clamp in engagement with the interlocking portion of the first clamp;

forming a notch in the distal end of the second clamp member and wherein the step of forming the finger over the distal end of the second clamp member further includes forming the finger into the notch;

placing the body portion of the first clamp member and the body portion of the second clamp member around the tube;

aligning the anchor flange of the first clamp member with the anchor flange of the second clamp member; and attaching the anchor flange of the second clamp member to the anchor flange of the first clamp member and the first clamp member to the supporting surface.

10. The method of claim 9 further comprising forming a first fastener receiving opening in the anchor flange of the first clamp member and a second fastener receiving opening in the anchor flange of the outer anchor flange of the second clamp member, and wherein the attaching step further includes inserting a fastener in the first and second fastener receiving openings to secure the inner and second clamp members to the supporting surface.

* * * * *

UNITED STATES PATENT AND TRADEMARK OFFICE
CERTIFICATE OF CORRECTION

| | | |
|---|---|---|
| PATENT NO. | : 7,540,071 B2 | Page 1 of 1 |
| APPLICATION NO. | : 11/375758 | |
| DATED | : June 2, 2009 | |
| INVENTOR(S) | : James M. Sampson | |

It is certified that error appears in the above-identified patent and that said Letters Patent is hereby corrected as shown below:

Column 5, Line 56, Claim 1:

Delete "tat" and insert -- that --.

Column 5, Line 6, Claim 1:

Delete "and" (second occurrence).

Signed and Sealed this

Eighteenth Day of August, 2009

David J. Kappos
*Director of the United States Patent and Trademark Office*